US012772355B2

(12) United States Patent
Takagimoto et al.

(10) Patent No.: US 12,772,355 B2
(45) Date of Patent: Oct. 20, 2026

(54) SEMICONDUCTOR DEVICE, SEMICONDUCTOR MODULE, LED DRIVE DEVICE, DC/DC CONVERTER, AND VEHICLE

(71) Applicant: ROHM CO., LTD., Kyoto (JP)

(72) Inventors: Shinsuke Takagimoto, Kyoto (JP); Akira Aoki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 61 days.

(21) Appl. No.: 18/897,512

(22) Filed: Sep. 26, 2024

(65) Prior Publication Data

US 2025/0119994 A1 Apr. 10, 2025

(30) Foreign Application Priority Data

Oct. 4, 2023 (JP) ................................ 2023-172654

(51) Int. Cl.
*H05B 45/345* (2020.01)
*H05B 45/375* (2020.01)
(Continued)

(52) U.S. Cl.
CPC ......... *H05B 45/345* (2020.01); *H05B 45/375* (2020.01); *H05B 45/38* (2020.01); *F21S 43/14* (2018.01)

(58) Field of Classification Search
CPC .... H05B 45/345; H05B 45/375; H05B 45/38; H05B 47/10; H05B 47/19; H05B 47/1965; H05B 45/20; H05B 47/165; H05B 47/197; H05B 47/17; H05B 47/199; H05B 47/196; H05B 47/16; H05B 47/195; H05B 47/115; H05B 47/155; H05B 47/1985; H05B 47/18; H05B 47/185; H05B 45/10; H05B 47/198; H05B 47/105; H05B 45/355; H05B 45/3725; H05B 47/12; H05B 47/175; H05B 47/184; H05B 47/187; H05B 45/385; H05B 47/11; H05B 45/325; H05B 45/52; H05B 45/30; H05B 45/33; H05B 45/357;
(Continued)

(56) References Cited

U.S. PATENT DOCUMENTS 10,178,721 B1 * 1/2019 Huang ............... H05B 45/3725
10,772,170 B2 * 9/2020 Yu .......................... G01R 31/44
(Continued)

FOREIGN PATENT DOCUMENTS

JP 2014-153822 8/2014

*Primary Examiner* — John W Poos
(74) *Attorney, Agent, or Firm* — Fish & Richardson P.C.

(57) ABSTRACT

A semiconductor device for controlling a driver circuit configured to drive an electronic device includes: a processing circuit configured to control the driver circuit according to a device address setting signal from outside and a control signal from outside; and an autonomous processing circuit provided independently of the processing circuit and configured to control the driver circuit under a preset condition, wherein when the device address setting signal falls within a predetermined condition, the processing circuit is enabled and the autonomous processing circuit is disabled, and when the device address setting signal deviates from the predetermined condition, the autonomous processing circuit is enabled and the processing circuit is disabled.

19 Claims, 10 Drawing Sheets

(51) Int. Cl.
*H05B 45/38* (2020.01)
*F21S 43/14* (2018.01)

(58) Field of Classification Search
CPC ...... H05B 45/00; H05B 45/37; H05B 47/183; H05B 45/32; H05B 45/335; H05B 45/44; H05B 39/042; H05B 41/3922; H05B 45/18; H05B 45/28; H05B 45/3578; H05B 45/382; H05B 45/56; H05B 47/125; H05B 47/13; H05B 45/58; H05B 47/00; H05B 47/1995; H05B 7/16; H03K 5/1252; H03K 19/17796; H03K 19/1776; H03K 3/356113; H03K 3/356182; H03K 23/00; H02J 3/00; H02J 3/14; H02J 4/00; H02J 50/80
See application file for complete search history.

(56) References Cited

U.S. PATENT DOCUMENTS

| | | | | |
|---|---|---|---|---|
| 10,986,710 | B2 * | 4/2021 | Chen | H05B 45/46 |
| 2012/0043902 | A1 * | 2/2012 | Kanamori | H05B 45/38<br>315/223 |
| 2014/0340295 | A1 * | 11/2014 | Zhang | G09G 3/3426<br>315/184 |
| 2016/0073461 | A1 * | 3/2016 | Jao | H05B 45/48<br>315/193 |

* cited by examiner

FIG. 4

| Device address setting signal Sa | | Device address Ad |
|---|---|---|
| 0 | VDD × 0. 1 | Autonomous operation |
| VDD × 0. 1 | VDD × 0. 3 | 0 |
| VDD × 0. 3 | VDD × 0. 5 | 1 |
| VDD × 0. 5 | VDD × 0. 7 | 2 |
| VDD × 0. 7 | VDD × 0. 9 | 3 |
| VDD × 0. 9 | VDD | Autonomous operation |

| Device address setting signal Sb | | Device address Ad |
|---|---|---|
| 0 | S1 | Autonomous operation |
| S1 | S2 | 0 |
| S2 | S3 | 1 |
| S3 | S4 | 2 |
| S4 | S6 | 3 |
| S6 | VDD | Autonomous operation |

| Device address setting signal Sc | | Device address Ad |
|---|---|---|
| 0 | VDD-U1 | Autonomous operation |
| VDD-U1 | VDD-U2 | 0 |
| VDD-U2 | VDD-U3 | 1 |
| VDD-U3 | VDD-U4 | 2 |
| VDD-U4 | VDD-U5 | 3 |
| VDD-U5 | VDD | Autonomous operation |

300

SEMICONDUCTOR DEVICE, SEMICONDUCTOR MODULE, LED DRIVE DEVICE, DC/DC CONVERTER, AND VEHICLE

CROSS-REFERENCE TO RELATED APPLICATION

This application is based upon and claims the benefit of priority from Japanese Patent Application No. 2023-172654, filed on Oct. 4, 2023, the entire contents of which are incorporated herein by reference.

TECHNICAL FIELD

The present disclosure relates to a semiconductor device, and relates to a semiconductor module, an LED drive device, a DC/DC converter, and a vehicle, which utilize the semiconductor device.

BACKGROUND

In an electronic device having a plurality of semiconductor devices, device addresses are assigned to identify the semiconductor devices. When sending an instruction to a semiconductor device, a device address and an operation associated with the device address are transmitted. This makes it possible to send an instruction to a specified semiconductor device.

BRIEF DESCRIPTION OF DRAWINGS

The accompanying drawings, which are incorporated in and constitute a part of the specification, illustrate embodiments of the present disclosure.

FIG. 4 is a schematic diagram of an address table.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In this specification, a case where it is stated that members are connected to each other includes a case where the members are mechanically connected, and a case where the members are electrically connected, i.e., a case where the members are in a state that allows a current to flow. Therefore, “connected” includes “electrically connected.”

A signal may be referred to as being at a high level or at a low level. When a voltage of a signal is higher than a threshold value, it is referred to as a high level, and when the voltage of the signal is lower than the threshold value, it is referred to as a low level.

<Semiconductor Device 1>

Figure 1:
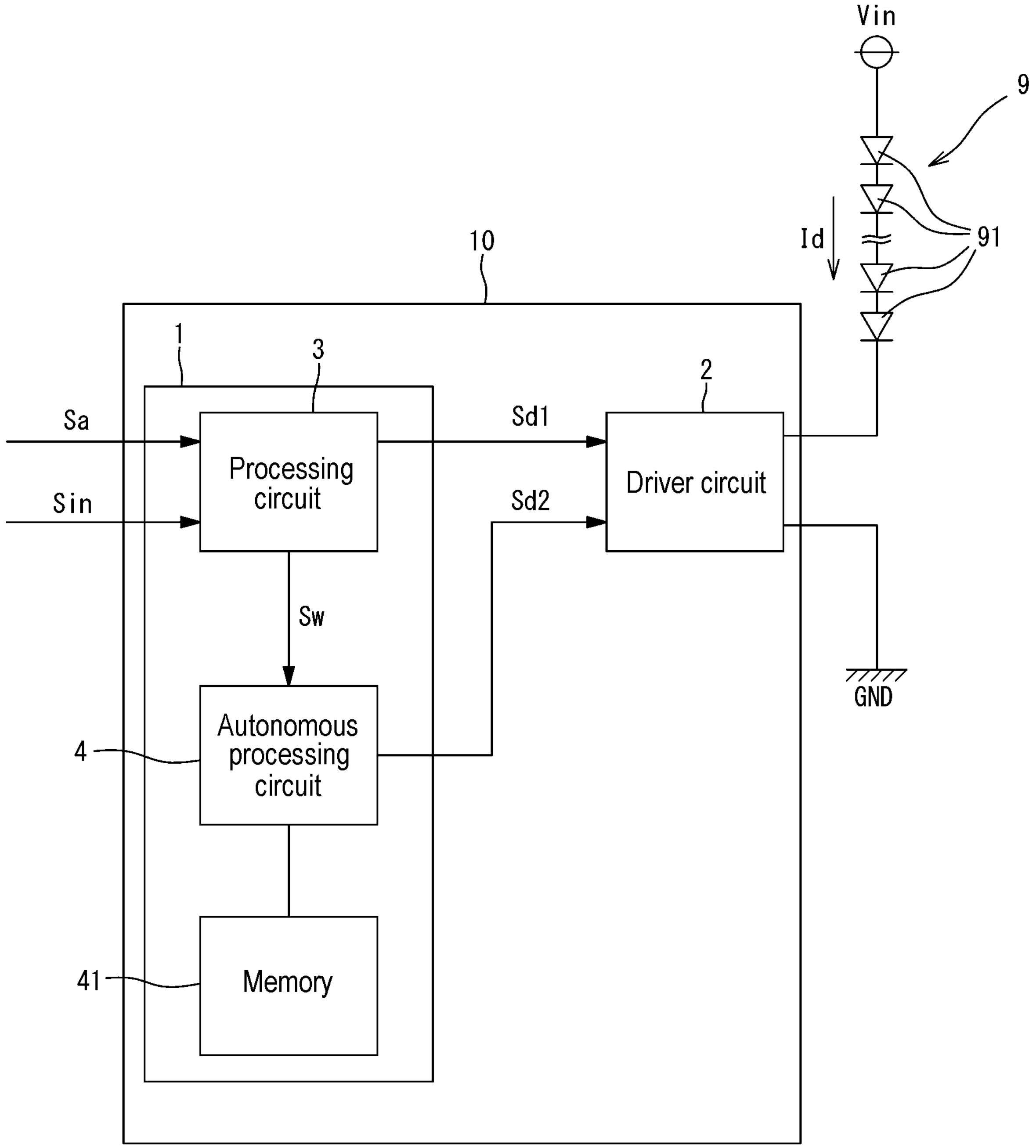
FIG. 1 is a block diagram of a semiconductor device.

FIG. 1 is a block diagram of a semiconductor device 1. As shown in FIG. 1, the semiconductor device 1 controls a driver circuit 2. An electronic device 9 is connected to the driver circuit 2. The driver circuit 2 drives the electronic device 9. In the present embodiment, the electronic device 9 connected to the driver circuit 2 is, for example, a lamp unit having a plurality of lighting emitting diodes (LEDs). The electronic device 9 includes a plurality of LEDs 91 connected in series. An anode of an LED 91 is connected to an input voltage Vin, and a cathode of another LED 91 is connected to the driver circuit 2. The driver circuit 2 is also connected to a ground GND. The driver circuit 2 allows a current Id to flow through the LEDs 91 to turn on the LEDs 91. The driver circuit 2 adjusts the current Id by pulse width modulation (PWM) control, thereby controlling dimming of the LEDs 91. In other words, the term “output setting” used in the following description with respect to the driver circuit 2 indicates a pulse period and on-duty in the PWM control.

However, the present disclosure is not limited to those described above. The driver circuit 2 may be a power supply circuit that outputs a specified current to a device connected thereto. In this case, the output setting indicates an output current value. Further, the driver circuit 2 may be a power supply circuit that outputs a specified voltage to a connected device. In this case, the output setting indicates an output voltage value. In addition, the output setting includes setting information necessary for driving a device to which the driver circuit 2 is connected.

As shown in FIG. 1, the semiconductor device 1 includes a processing circuit (first processing circuit) 3 and an autonomous processing circuit (second processing circuit) 4. A device address Ad (see FIG. 9 and the like) for identifying each entity is set in the semiconductor device 1. A control signal Sin is input from outside to the semiconductor device 1, and the control signal Sin contains device address information. The semiconductor device 1 operates according to drive information included in the control signal Sin which contains its own device address information.

The processing circuit 3 receives a device address setting signal Sa from an address signal output circuit 6 to be described later and receives the control signal Sin from a control device 5 to be described later. The processing circuit 3 recognizes the device address Ad of the semiconductor device 1 based on the device address setting signal Sa. The control signal Sin contains address information specifying the device address Ad and drive information including the output setting associated with the address information. The control signal Sin may include one piece of address information and one piece of drive information, or may include multiple pieces of address information and drive information associated with each piece of the address information.

The processing circuit 3 refers to the recognized device address Ad and the address information of the control signal Sin, and outputs a first drive signal Sd1 to the driver circuit 2 according to the drive information associated with the address information that matches the device address Ad.

The first drive signal Sd1 is a signal for driving the driver circuit 2. The first drive signal Sd1 contains operation designation information that designates an operation or stoppage of the driver circuit 2, and output setting information that includes an output setting. The driver circuit 2 receives the first drive signal Sd1, and selects either operation or stoppage according to the operation designation information. In addition, the driver circuit 2 drives the LEDs 91 with the output setting according to the output setting information.

That is, the drive information of the control signal Sin contains the output setting. For example, in a configuration for controlling the driver circuit 2 that drives the LEDs 91, the drive information may be information that specifies a turn-on state including luminance of the LEDs 91 instead of the pulse frequency and on-duty. That is, the drive information of the control signal Sin may be information that specifies an operation state of the device controlled by the driver circuit 2.

Further, the processing circuit 3 is switched between an enabled state and a disabled state. When the processing circuit 3 is in the enabled state, the driver circuit 2 is controlled according to the first drive signal Sd1 output from the processing circuit 3. When the processing circuit 3 is in the disabled state, the driver circuit 2 is not driven by the first drive signal Sd1 output from the processing circuit 3.

The disabled state of the processing circuit 3 may be, for example, a case where the processing circuit 3 does not output the first drive signal Sd1, a case where the processing circuit 3 outputs a signal that the driver circuit 2 cannot recognize as the first drive signal Sd1, and the like. The processing circuit 3 executes an operation even in the disabled state, and outputs a switching signal Sw to the autonomous processing circuit 4. That is, as the disabled state of the processing circuit 3, it is possible to widely adopt a state in which the driver circuit 2 is not driven and the autonomous processing circuit 4 can be put into an enabled state.

The autonomous processing circuit 4 is provided independently of the processing circuit 3. The autonomous processing circuit 4 being independent of the processing circuit 3 means that in controlling the driver circuit 2, a process by the autonomous processing circuit 4 is executed as a process completely different from a process by the processing circuit 3. Therefore, a case where the autonomous processing circuit 4 is switched between the enabled state and the disabled state by the switching signal Sw from the processing circuit 3 is also included in the autonomous processing circuit 4 being independent of the processing circuit 3. Further, as long as the process of the processing circuit 3 and the process of the autonomous processing circuit 4 are independent, a circuit may be partially shared.

The autonomous processing circuit 4 receives the switching signal Sw from the processing circuit 3. The switching signal Sw is a signal that can take a low level or a high level. When the processing circuit 3 is in the enabled state, the switching signal Sw is at a low level. When the processing circuit 3 is in the disabled state, the switching signal Sw is at a high level. The autonomous processing circuit 4 is in the enabled state when it receives a high-level switching signal Sw. The autonomous processing circuit 4 is in the disabled state when it receives a low-level switching signal Sw.

When the autonomous processing circuit 4 is in the enabled state, the autonomous processing circuit 4 outputs a second drive signal Sd2 to the driver circuit 2. The driver circuit 2 is driven to make an output according to operation designation information and output setting information of the second drive signal Sd2 output from the autonomous processing circuit 4. The operation designation information and the output setting information of the second drive signal Sd2 have predetermined information regardless of the control signal Sin.

For example, when always turning-on of the LEDs 91 is desirable, the drive information of the control signal Sin includes information for turning on the LEDs 91. When the driver circuit 2 is driven by the first drive signal Sd1 from the processing circuit 3, the LEDs 91 are turned on. On the other hand, when the autonomous processing circuit 4 is in the enabled state, the driver circuit 2 is driven by the second drive signal Sd2. As described above, the second drive signal Sd2 has the predetermined operation designation information and the predetermined output setting information. Therefore, the driver circuit 2 is driven by the second drive signal Sd2 to turn the LEDs 91 on, regardless of the control signal Sin. That is, since the LEDs 91 are turned on even when the processing circuit 3 is not operating, it is possible to improve user's convenience.

In addition, the second drive signal Sd2 for operating a device connected to the driver circuit 2 to improve the user's convenience may be output. In so doing, the user's convenience can be improved. In addition, there may be a case where the user's convenience is improved by not operating a device connected to the driver circuit 2 when the processing circuit 3 is not operating. In such a case, the second drive signal Sd2 may contain information for stopping the device connected to the driver circuit 2. For example, the second drive signal Sd2 may contain stop information as the operation designation information. Alternatively, the driver circuit 2 itself may be stopped.

In addition, when the autonomous processing circuit 4 is in the disabled state, the driver circuit 2 is not driven by the second drive signal Sd2 output from the autonomous processing circuit 4. Examples of the disabled state of the autonomous processing circuit 4 include a state in which the autonomous processing circuit 4 is stopped, a state in which the second drive signal Sd2 is not output, and a state in which the autonomous processing circuit 4 outputs a second drive signal Sd2 that cannot be recognized by the driver circuit 2. In addition, the disabled state of the autonomous processing circuit 4 may broadly contain a setting that prevents the autonomous processing circuit 4 from driving the driver circuit 2.

In the semiconductor device 1, when the processing circuit 3 is in the enabled state, the autonomous processing circuit 4 is in the disabled state. Further, when the processing circuit 3 is in the disabled state, the autonomous processing circuit 4 is in the enabled state. In the semiconductor device 1, when the processing circuit 3 is in the enabled state and the autonomous processing circuit 4 is in the disabled state, the driver circuit 2 is controlled by the first drive signal Sd1. On the other hand, when the processing circuit 3 is in the disabled state and the autonomous processing circuit 4 is in the enabled state, the driver circuit 2 is controlled by the second drive signal Sd2.

A non-transitory computer-readable memory 41 is connected to the autonomous processing circuit 4. Information for setting the second drive signal Sd2 is stored in the memory 41, and the autonomous processing circuit 4 outputs the second drive signal Sd2 containing the information stored in the memory 41.

The memory 41 may adopt, for example, a random access memory (RAM) which is a storage element, and may be configured such that the setting information can be changed before or after shipment of the semiconductor device 1. A built-in memory that allows information to be rewritten, such as an erasable programmable read only memory (EPROM) or an electrically erasable programmable read only memory (EEPROM), may be adopted. Further, the memory 41 may adopt a detachable external memory using a flash memory or the like. Further, a storage element other than those described above may be adopted. Furthermore, a memory that allows only outputting the setting information, such as a read only memory (ROM) or the like, may be adopted.

The semiconductor device 1 has the above-described configuration. The semiconductor device 1 may be a functional IC (Integrated Circuit) 10. In this case, the driver circuit 2 may also be incorporated into the functional IC 10.

Figure 2:
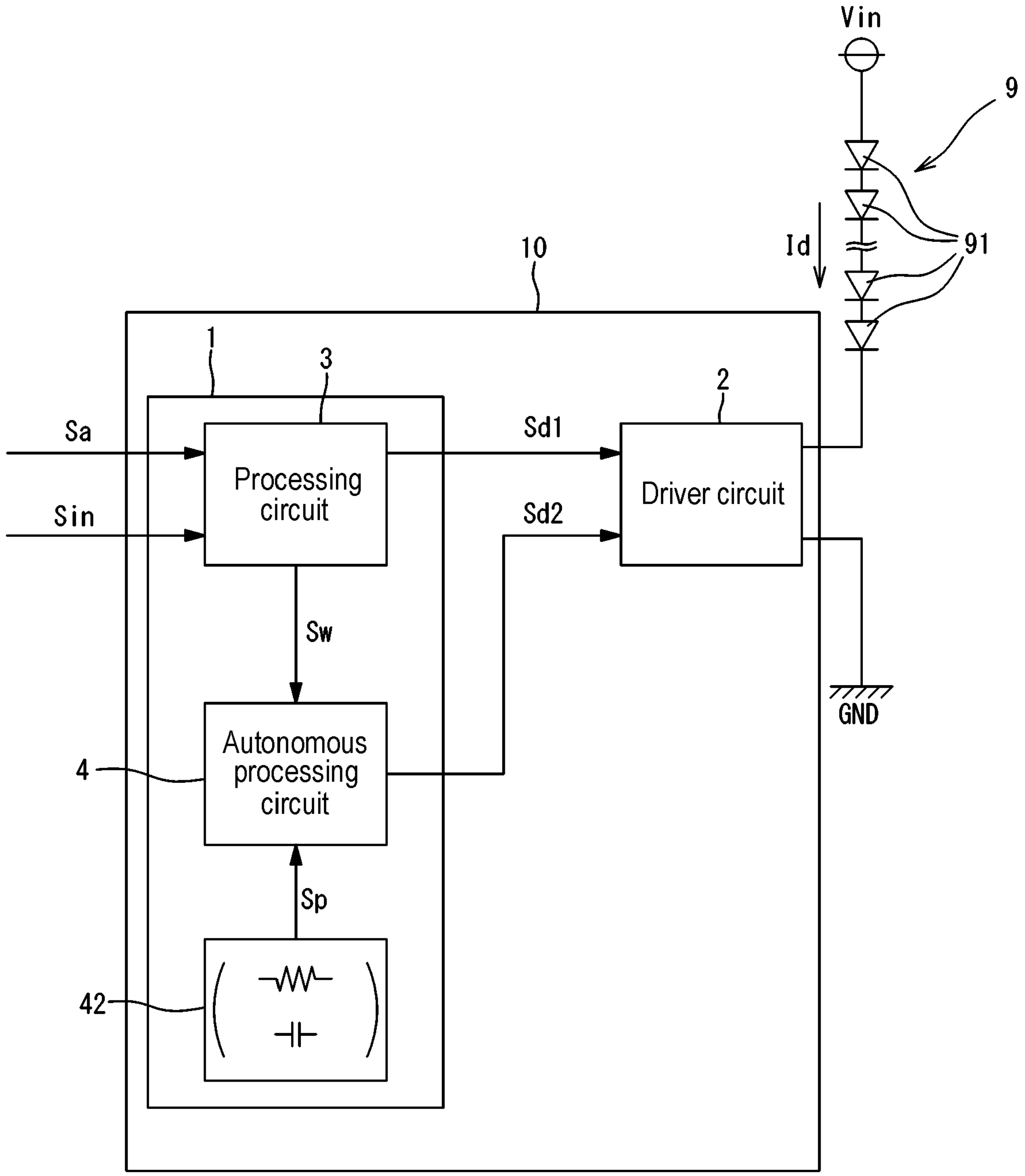
FIG. 2 is a block diagram of a semiconductor device including a setting circuit.

In addition, the driver circuit 2 may be configured to output, for example, to an electronic device connected thereto, a voltage signal for controlling the electronic device. In such a configuration, a setting circuit 42 as shown in FIG. 2 may be connected to the autonomous processing circuit 4. FIG. 2 is a block diagram of the semiconductor device 1 including the setting circuit 42. The setting circuit 42 has at least one of a resistor 421 or a capacitor 422. The setting circuit 42 is connected to a power supply voltage VDD, and outputs a designation signal Sp that designates output setting information of the second drive signal Sd2. The autonomous processing circuit 4 may generate a second drive signal Sd2 that can produce an output according to the designation signal Sp.

<Semiconductor Module 100>

Figure 3:
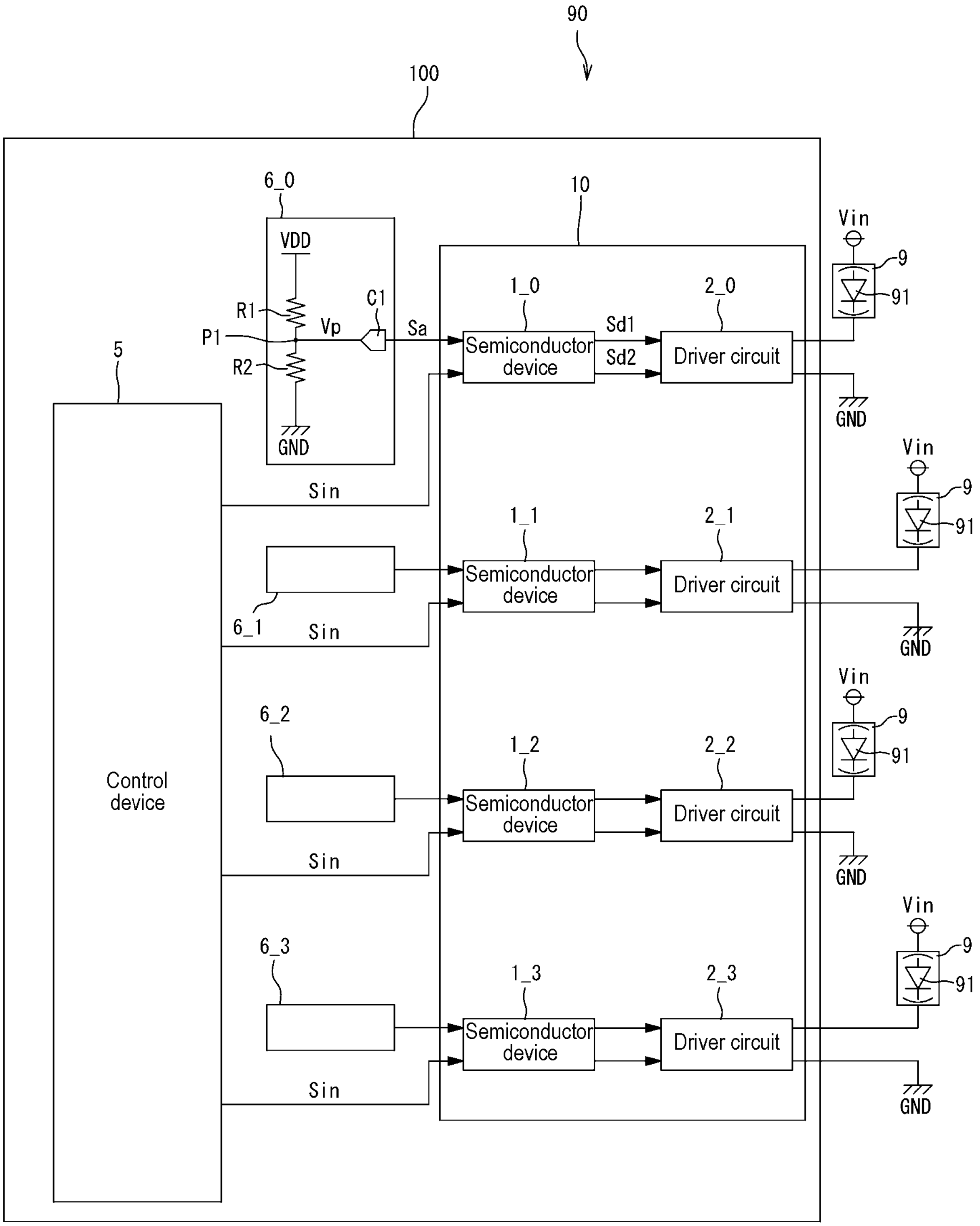
FIG. 3 is a block diagram of a semiconductor module.

FIG. 3 is a block diagram of a semiconductor module 100. The semiconductor module 100 shown in FIG. 3 includes a plurality of electronic devices 9 each having LEDs 91, and constitutes a part of an LED drive device 90 that controls driving of the LED 91. As shown in FIG. 3, the semiconductor module 100 includes a control device 5, a plurality of semiconductor devices 1, a plurality of driver circuits 2, and an address signal output circuit 6. In the semiconductor module 100, at least the semiconductor devices 1, the driver circuits 2, the control device 5, and the address signal output circuit 6 may be formed in a single package.

As shown in FIG. 3, the semiconductor module 100 of the present embodiment has four semiconductor devices 1. However, the number of semiconductor devices 1 in the semiconductor module 100 is not limited to four. In addition, the number of driver circuits 2 is the same as the number of semiconductor devices 1.

A device address Ad is set for each semiconductor device 1. In the semiconductor module 100, the device addresses Ad are 0, 1, 2, and 3. The semiconductor devices 1 having device addresses Ad of 0, 1, 2, and 3 may be referred to as semiconductor devices 1_0, 1_1, 1_2, and 1_3, respectively. In addition, the semiconductor module 100 may include a plurality of semiconductor devices 1 having the same device address Ad.

As described above, the processing circuit 3 receives the device address setting signal Sa and recognizes the device address of the semiconductor device 1 including the processing circuit 3. Hereinafter, the device address setting signal Sa and the address signal output circuit 6 that outputs the device address setting signal Sa will be described.

As shown in FIG. 3, the address signal output circuit 6 has voltage-dividing resistors R1 and R2 and an AD converter C1. The address signal output circuit 6 is a circuit that outputs a device address setting signal Sa to each of the semiconductor devices 1. Therefore, the address signal output circuit 6 connected to each of the semiconductor devices 1 may also be described with subscripts. Further, components of the address signal output circuit 6 may also be described with subscripts as necessary.

In the address signal output circuit 6, the voltage-dividing resistors R1 and R2 are connected in series. A first end of the voltage-dividing resistors R1 and R2 connected in series is connected to the power supply voltage VDD. A second end of the voltage-dividing resistors R1 and R2 is connected to the ground GND. An AD converter C1 is connected to a connection point P1 between the voltage-dividing resistors R1 and R2. When the semiconductor device 1 is configured as the functional IC 10, at least the AD converter C1 may be incorporated into the functional IC 10. In addition, the voltage-dividing resistors R1 and R2 may also be incorporated into the functional IC 10. In the address signal output circuit 6 according to the present embodiment, the AD converter C1 is configured to be incorporated into the functional IC 10.

In the address signal output circuit 6, an address voltage Vp obtained by dividing the power supply voltage VDD by the voltage-dividing resistors R1 and R2 is input to the AD converter C1. The AD converter C1 digitizes the address voltage Vp, which is analog information, and outputs it to the processing circuit 3 as the device address setting signal Sa.

FIG. 4 is a schematic diagram of an address table Tb1. The address table Tb1 shown in FIG. 4 associates the device address setting signal Sa with the device address Ad. The processing circuit 3 recognizes the device address by referring to the address table Tb1 and the device address setting signal Sa shown in FIG. 4.

The address voltage Vp for generating the device address setting signal Sa may vary according to the voltage-dividing resistor R1, the voltage-dividing resistor R2, and variations in resistance of the circuit. Therefore, in the address table Tb1, the device address setting signal Sa associated with each device address Ad is configured to have a certain range.

For example, in the address table Tb1 shown in FIG. 4, when the device address setting signal Sa is 0.1 times or more and less than 0.3 times the power supply voltage VDD, the device address Ad is "0." Similarly, when the device address setting signal Sa is 0.3 times or more and less than 0.5 times the power supply voltage VDD, the device address Ad is "1." Further, when the device address setting signal Sa is 0.5 times or more and less than 0.7 times the power supply voltage VDD, the device address Ad is "2." When the device address setting signal Sa is 0.7 times or more and less than 0.9 times the power supply voltage VDD, the device address Ad is "3."

For example, in an address signal output circuit 6_0 connected to a semiconductor device 1_0 having a device address "0," the voltage-dividing resistors R1 and R2 are set so that the address voltage Vp falls within a range from 0.1 times to 0.3 times the power supply voltage VDD. According to the present embodiment, for example, in the address signal output circuit 6_0 having the device address Ad "0," the voltage-dividing resistors R1 and R2 are set so that the device address setting signal Sa becomes a center of the range, i.e., approximately 0.2 times the power supply voltage VDD.

In other address signal output circuits 6_1, 6_2, and 6_3, the voltage-dividing resistors R1 and R2 are set so that the address voltage Vp becomes, for example, approximately 0.4 times, approximately 0.6 times, and approximately 0.8 times the power supply voltage VDD, respectively. By setting the voltage-dividing resistors R1 and R2 as described above, it is possible to obtain the device address Ad even when the address voltage Vp becomes larger or smaller than the set value due to variations in resistance of the voltage-dividing resistors R1 and R2. The setting of the voltage-dividing resistors R1 and R2 are not limited to those described above, as long as the device address setting signal Sa falls within the respective ranges in the address table Tb1 shown in FIG. 4.

In addition, in the address signal output circuit 6, connection with the power supply voltage VDD may become insufficient, i.e., may become open, due to abnormality in a wiring connected to the power supply voltage VDD and the like. In this case, the address voltage Vp becomes approximately zero. Further, the voltage-dividing resistor R1 may become short-circuited, and in this case, the address voltage Vp becomes approximately equal to the power supply voltage VDD.

In addition, the connection with the ground GND may be open. In this case, the address voltage Vp becomes approximately equal to the power supply voltage VDD. Further, the voltage-dividing resistor R2 may become short-circuited, and in this case, the address voltage Vp becomes approximately zero. As described above, when abnormality occurs in the address signal output circuit 6, the address voltage Vp becomes approximately zero or approximately equal to the power supply voltage VDD.

In preparation for occurrence of abnormality described above, in the address table Tb1 shown in FIG. 4, an autonomous operation is associated with a device address setting signal Sa that is less than 0.1 times the power supply voltage VDD or equal to or more than 0.9 times the power supply voltage VDD. When recognizing the autonomous operation from the device address setting signal Sa, the processing circuit 3 does not set the device address Ad.

In the semiconductor module 100 according the present embodiment, given that a first threshold value Th1 is 0.1 and a second threshold value Th2 is 0.9, the processing circuit 3 is in an enabled state when the device address setting signal Sa is equal to or greater than the first threshold value Th1 and smaller than the second threshold value Th2. In addition, when it is known that the device address setting signal Sa will not be approximately equal to the value of the power supply voltage VDD, only the first threshold value Th1 may be used as the address table Tb1. In addition, when it is known that the device address setting signal Sa will not be approximately zero, only the second threshold value Th2 may be used as the address table Tb1.

Figure 5:
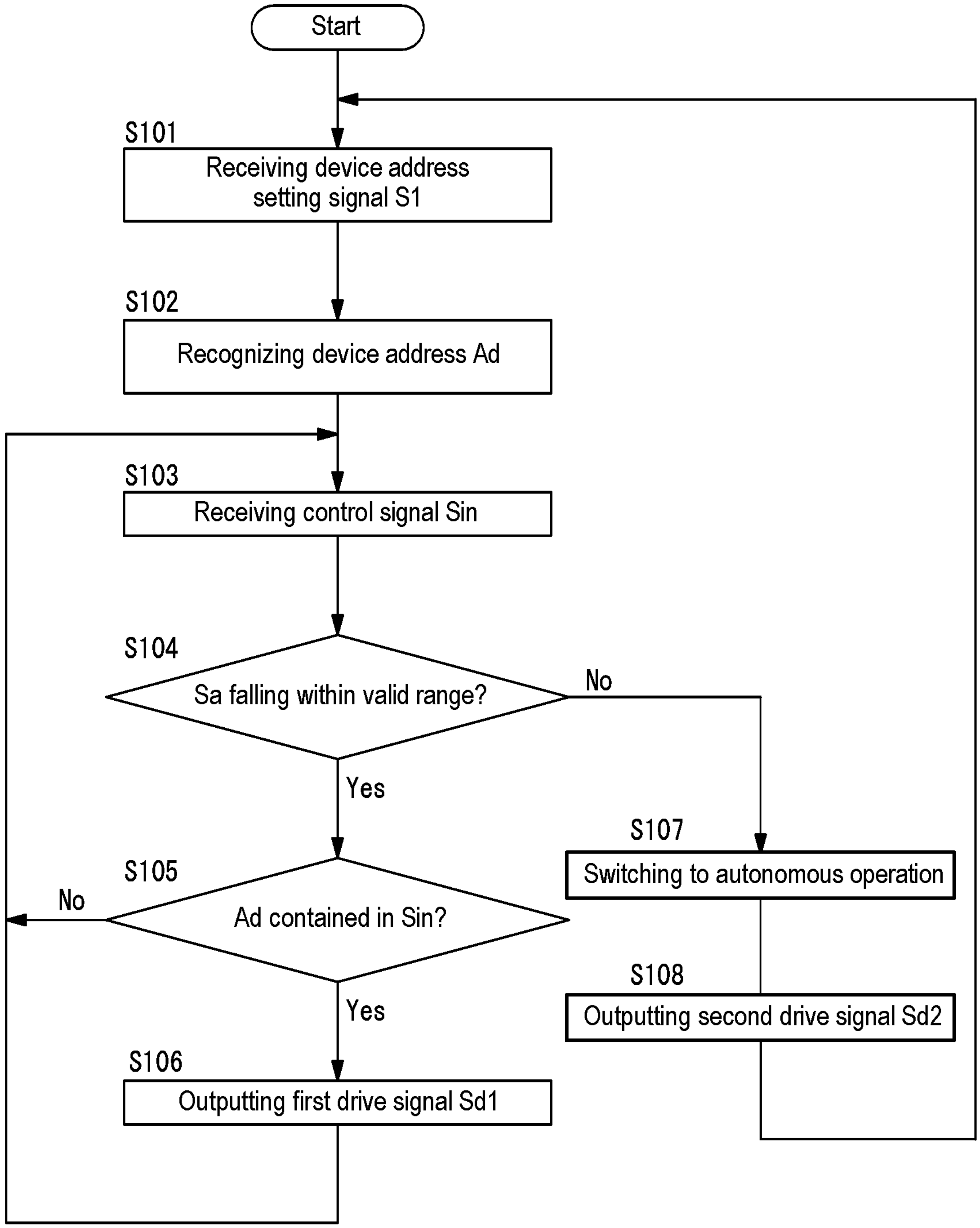
FIG. 5 is a flowchart showing an operation of the semiconductor device.

Next, an operation of the semiconductor device 1 will be described with reference to the drawings. FIG. 5 is a flowchart showing an operation of the semiconductor device 1. In the address signal output circuit 6, the power supply voltage VDD is supplied simultaneously with a start of an operation of the semiconductor module 100. Therefore, the processing circuit 3 receives the device address setting signal Sa simultaneously with the start of the operation of the semiconductor module 100 (step S101). Then, the processing circuit 3 recognizes the device address Ad of the semiconductor device 1 by referring to the device address setting signal Sa and the address table Tb1 (step S102).

In the semiconductor module 100, the processing circuit 3 of each semiconductor device 1 receives the control signal Sin (step S103). As described above, the control signal Sin output from the control device 5 is a signal to be output to all semiconductor devices 1, and is a signal containing common information. For example, the control signal Sin is a signal having information in which the device address Ad is associated with drive information that determines a turn-on state (operation state) of the LEDs 91 which form a device. As shown in FIG. 1, the control signal Sin is input to the processing circuit 3 of the semiconductor device 1. In addition, receiving the control signal Sin is not limited to after recognizing the device address Ad. For example, the control signal Sin may be received at the same timing as or before receiving the device address setting signal Sa.

The processing circuit 3 determines, from the device address setting signal Sa, whether the device address setting signal Sa falls within a valid range (step S104). The device address setting signal Sa falling within the valid range indicates that the device address setting signal Sa is equal to or greater than the first threshold value Th1 and smaller than the second threshold value Th2. In the present embodiment, when the device address setting signal Sa is equal to or greater than 0.1 times and smaller than 0.9 times the power supply voltage VDD, the device address setting signal Sa is considered to fall within the valid range.

When the device address setting signal Sa falls within the valid range ("Yes" in step S104), the processing circuit 3 determines whether the address information of the control signal Sin contains the device address Ad of the semiconductor device 1 in which the processing circuit 3 is included (step S105). When the control signal Sin contains the device address Ad ("Yes" in step S105), the processing circuit 3 outputs the first drive signal Sd1 for executing an operation associated with the device address Ad to the driver circuit 2 (step S106). The first drive signal Sd is a signal that operates the driver circuit 2 so that the LEDs 91 are turned on in a drive state associated with the device address Ad of the control signal Sin. Content of the control signal Sin from the control device 5 may be changed. Therefore, the processing circuit 3 returns to step S103 and continues to receive the control signal Sin.

When the address information of the control signal Sin does not contain the device address Ad of the semiconductor device 1 in which the processing circuit 3 is included ("No" in step S105), the processing circuit 3 maintains a current state, returns to step S103, and continues to perform processing. When the address information of the control signal Sin does not contain the device address Ad, the processing circuit 3 may continue to output the first drive signal Sd1 up to that point. When the address information of the control signal Sin does not contain the device address Ad, the processing circuit 3 may stop outputting the first drive signal Sd1 without maintaining the current state.

In addition, when the device address setting signal Sa does not fall within the valid range ("No" in step S104), the processing circuit 3 switches the switching signal Sw to a high level to switch to an autonomous operation, thereby switching the processing circuit 3 itself to a disabled state and switching the autonomous processing circuit 4 to an enabled state (step S107).

Then, the autonomous processing circuit 4 outputs the second drive signal Sd2 to the driver circuit 2 (step S108). Thereafter, the process returns to step S101 and restarts receiving the device address setting signal Sa. At this time, although the processing circuit 3 is in the disabled state in which the processing circuit 3 does not output the valid first drive signal Sd1, the processing circuit 3 can perform processing such as recognizing the device address Ad.

Therefore, even when the processing circuit 3 is in the disabled state, the processing continues.

As described above, in the semiconductor module 100 including the semiconductor device 1, the semiconductor device 1 can recognize its own device address Ad and execute processing according to the device address Ad. With this configuration, signal processing can be simplified compared to a case where control signals having individual information are transmitted to a plurality of semiconductor devices 1.

Further, in addition to the simple configuration of the address signal output circuit 6, it is possible to prevent the driver circuit 2 from being controlled with an incorrect output setting when a correct device address setting signal Sa is not output due to a problem of the address signal output circuit 6. Furthermore, at the same time, since a predetermined second drive signal Sd2 is output from the autonomous processing circuit 4, it is possible to control the driver circuit 2 with a determined output setting.

In addition, in the above-described process, the processing circuit 3 is configured to recognize the device address Ad at the beginning of the process, but the present disclosure is not limited thereto. As described above, the address signal output circuit 6 is configured to output the device address setting signal Sa to the semiconductor device 1 when the semiconductor module 100 starts up. Therefore, before the process is executed, the processing circuit 3 may be in a state where the processing circuit 3 recognizes the device address Ad of the semiconductor device 1 in which the processing circuit 3 itself is included.

In addition, in the present embodiment, the processing circuit 3 is configured to always receive the device address setting signal Sa to recognize the device address Ad. However, the present disclosure is not limited thereto. For example, the device address Ad recognized when the semiconductor module 100 is started up, in other words, when the power is turned on, may be stored, and then the processing circuit 3 may use the stored device address Ad until the power of the semiconductor module 100 is turned off.

With this configuration, even when there is a problem in the address signal output circuit 6, the driver circuit 2 can be controlled to light up the LEDs 91. Thus, it is possible to improve the user convenience.

First Modification

Figure 6:
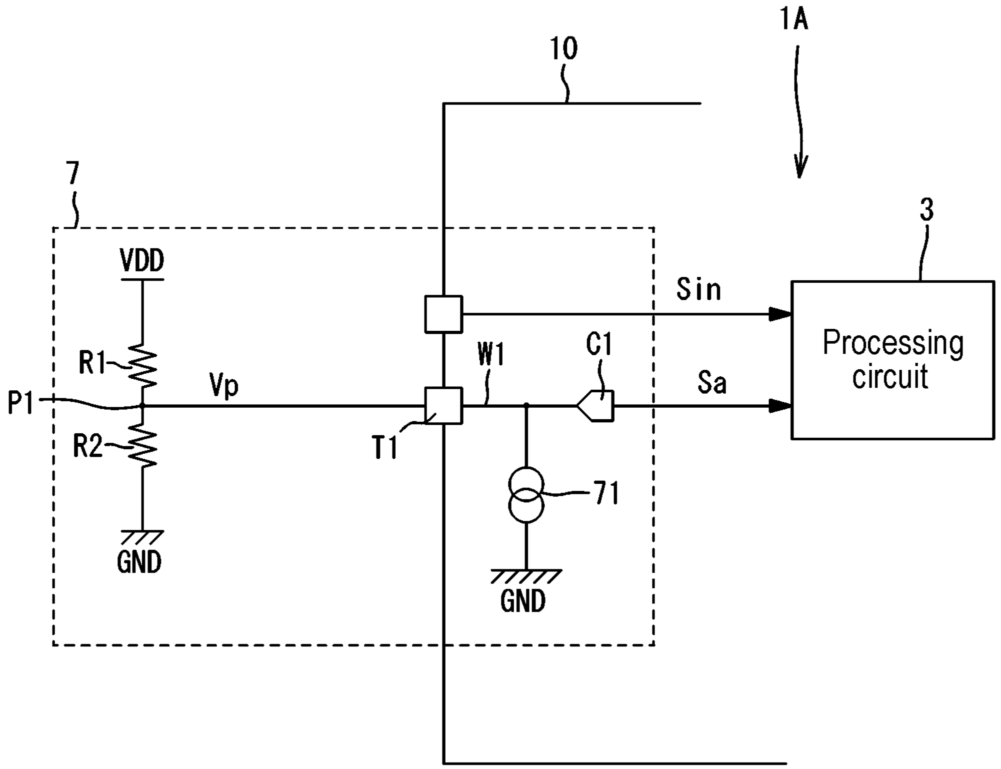
FIG. 6 is a schematic circuit diagram of an address signal output circuit of a first modification.

FIG. 6 is a schematic circuit diagram of an address signal output circuit 7 of a first modification. The address signal output circuit 7 shown in FIG. 6 differs from the address signal output circuit 6 in that the address signal output circuit 7 includes a constant current circuit 71. The address signal output circuit 7 has substantially the same configuration as the address signal output circuit 6 in other respects. Therefore, the same reference numerals are used for parts of the address signal output circuit 7 that are substantially the same as those of the address signal output circuit 6, and detailed descriptions of the same parts will be omitted.

As shown in FIG. 6, in the address signal output circuit 7, the constant current circuit 71 is connected to a wiring W1 that connects the connection point P1 between the voltage-dividing resistors R1 and R2 and the AD converter C1. A first end of the constant current circuit 71 is connected to the wiring W1 that connects the connection point P1 and the AD converter C1, and a second end is connected to the ground GND. The constant current circuit 71 is connected so as to draw a current from the wiring that connects the connection point P1 and the AD converter C1 to the ground. The constant current circuit 71 constitutes a pull-down circuit. In addition, in a semiconductor device 1A, the constant current circuit 71 may be incorporated into the functional IC 10.

By providing the constant current circuit 71 as described above, when the wiring between the connection point P1 between the voltage-dividing resistors R1 and R2 and the AD converter C1 is cut, the address voltage Vp input to the processing circuit 3 is reduced by the constant current circuit 71. In addition, in the address signal output circuit 7, the constant current circuit 71 is set so that the address voltage Vp becomes less than 0.1 times the power supply voltage VDD when the wiring W1 between the connection point P1 and the AD converter C1 is cut. Thus, it is possible to cause the processing circuit 3 to select an autonomous operation by referring to the address table Tb1 shown in FIG. 4 when the wiring W1 between the connection point P1 and the AD converter C1 is cut.

For example, it is assumed that the AD converter C1 is incorporated into the functional IC 10 and the voltage-dividing resistors R1 and R2 are disposed outside the functional IC 10. In this state, the wiring W1 may be considered to be cut when the connection between the connection point P1 between the voltage-dividing resistors R1 and R2 and an external terminal T1 of the functional IC 10 becomes open. As shown in FIG. 6, by incorporating the constant current circuit 71 into the functional IC 10 constituting the semiconductor device 1A, it is possible to reliably perform an autonomous operation when the connection to the external terminal T1 becomes insufficient.

Figure 7:
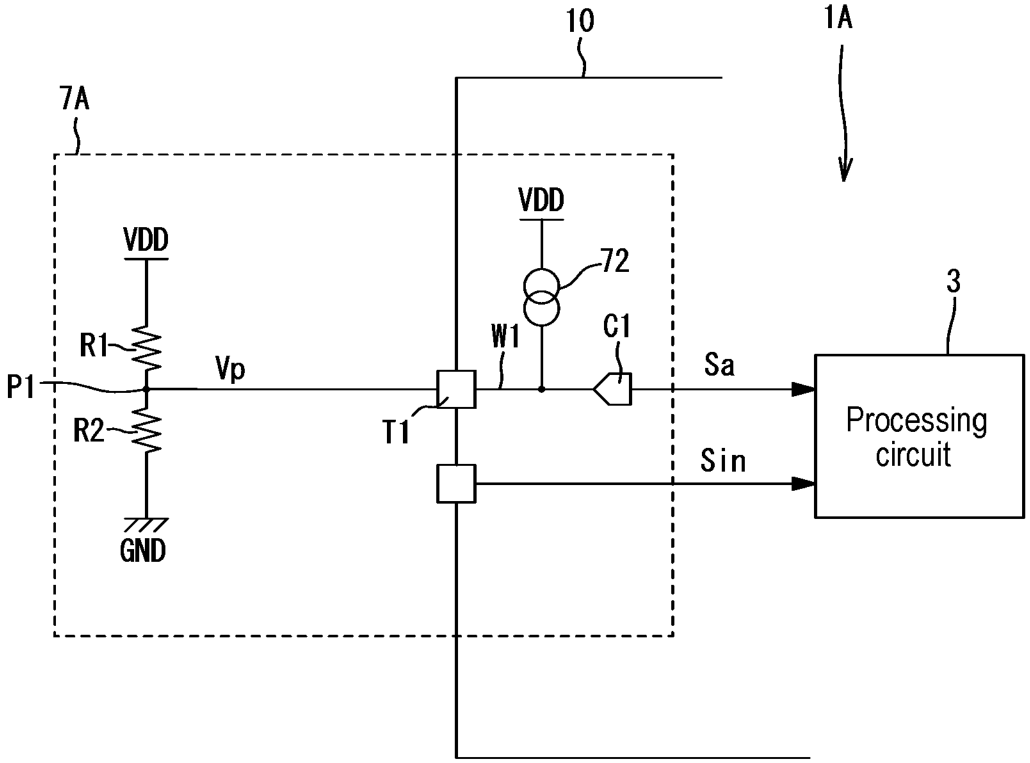
FIG. 7 is a schematic circuit diagram of an address signal output circuit of another example of the first modification.

FIG. 7 is a schematic circuit diagram of an address signal output circuit of another example of the first modification. As in an address signal output circuit 7A shown in FIG. 7, a constant current circuit 72 may be provided between the wiring W1 connecting the connection point P1 and the AD converter C1 and the power supply voltage VDD. By providing the constant current circuit 72 as described above, a current is caused to flow into the wiring W1 connecting the connection point P1 and the AD converter C1. The constant current circuit 72 constitutes a pull-up circuit. In addition, in the semiconductor device 1A, the constant current circuit 72 may be incorporated into the functional IC 10.

By providing the constant current circuit 72 as described above, when the wiring between the connection point P1 between the voltage-dividing resistors R1 and R2 and the AD converter C1 is cut, the address voltage Vp input to the processing circuit 3 is increased by the constant current circuit 72. In the address signal output circuit 7, the constant current circuit 72 is set so that the address voltage Vp becomes equal to or more than 0.9 times the power supply voltage VDD when the wiring between the connection point P1 and the AD converter C1 is cut. Thus, it is possible to cause the processing circuit 3 to select an autonomous operation by referring to the address table Tb1 shown in FIG. 4 when the wiring between the connection point P1 and the AD converter C1 is cut.

In addition, as shown in FIG. 7, by incorporating the constant current circuit 72 into the functional IC 10 constituting the semiconductor device 1A, it is possible to reliably perform the autonomous operation when the connection to the external terminal T1 becomes insufficient.

By using the address signal output circuits 7 and 7A of the first modification, in addition to the case in which either the voltage-dividing resistor R1 or the voltage-dividing resistor R2 is open or short-circuited, the processing circuit 3 can also be caused to select the autonomous operation when the wiring is open. Thus, it is possible to improve the user convenience.

Second Modification

Figures 8, 9:
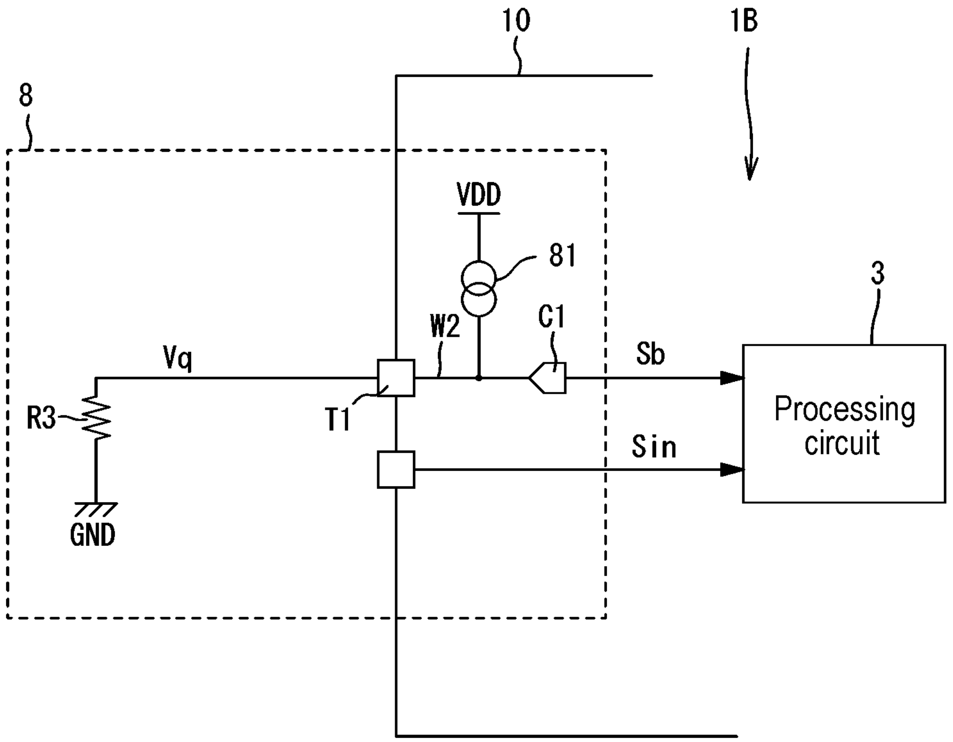
FIG. 8 is a schematic circuit diagram showing an address signal output circuit of a second modification.
FIG. 9 is a schematic diagram of the address table when the address signal output circuit shown in FIG. 8 is used.

FIG. 8 is a schematic circuit diagram showing an address signal output circuit 8 of a second modification. FIG. 9 is a schematic diagram of an address table Tb2 when the address signal output circuit 8 shown in FIG. 8 is used. The address signal output circuit 8 shown in FIG. 8 is different from the address signal output circuit 7A in that the address signal output circuit 8 includes a constant current circuit 81 and includes a resistor R3 instead of the voltage-dividing resistors R1 and R2. The address signal output circuit 8 has substantially the same configuration as the address signal output circuit 6 in other respects. Therefore, the same reference numerals are used for parts of the address signal output circuit 8 that are substantially the same as those of the address signal output circuit 6, and detailed descriptions of the same parts will be omitted.

As shown in FIG. 8, the constant current circuit 81 is a pull-up circuit. In addition, in the address signal output circuit 8 connected to a semiconductor device 1B, the constant current circuit 81 may be incorporated into the functional IC 10. A power supply voltage VDD is connected to a wiring W2 via the constant current circuit 81, and a current flows from the constant current circuit 81 to the wiring W2. The current flowing from the constant current circuit 81 to the wiring W2 flows through the resistor R3. When the current flowing from the constant current circuit 81 to the wiring W2 is a current I and a resistance value of the resistor R3 is a resistance value R, an address voltage Vq is given by a product of the current I and the resistance value R. Therefore, the address voltage Vq can be adjusted by adjusting the resistance value R.

The address signal output circuit 8 shown in FIG. 8 is configured so that the device address Ad can be determined by a value of a device address setting signal Sb obtained by digital conversion of the address voltage Vq.

For example, in an address table Tb2 shown in FIG. 9, when the device address setting signal Sb is equal to or greater than S1 and smaller than S2, the device address Ad is "0." Similarly, when the device address setting signal Sb is equal to or greater than S2 and smaller than S3, the device address Ad is "1." Further, when the device address setting signal Sb is equal to or greater than S3 and smaller than S4, the device address Ad is "2." When the device address setting signal Sb is equal to or greater than S4 and smaller than S5, the device address Ad is "3."

In addition, in the address signal output circuit 8, due to abnormality in the wiring connected to the resistor R3, connection of the address signal output circuit 8 to the resistor R3 may become insufficient, i.e., the address signal output circuit 8 may be open. In this case, the address voltage Vq becomes approximately equal to the power supply voltage VDD. Further, the resistance value of the resistor R3 may become very small. In this case, the address voltage Vq becomes approximately zero. As described above, when abnormality occurs in the address signal output circuit 8, the address voltage Vq becomes approximately zero or approximately equal to the power supply voltage VDD.

In preparation for occurrence of the abnormality described above, in the address table Tb2 shown in FIG. 9, an autonomous operation is associated with a device address setting signal Sb smaller than S1 or equal to or greater than S6.

Figures 10, 11:
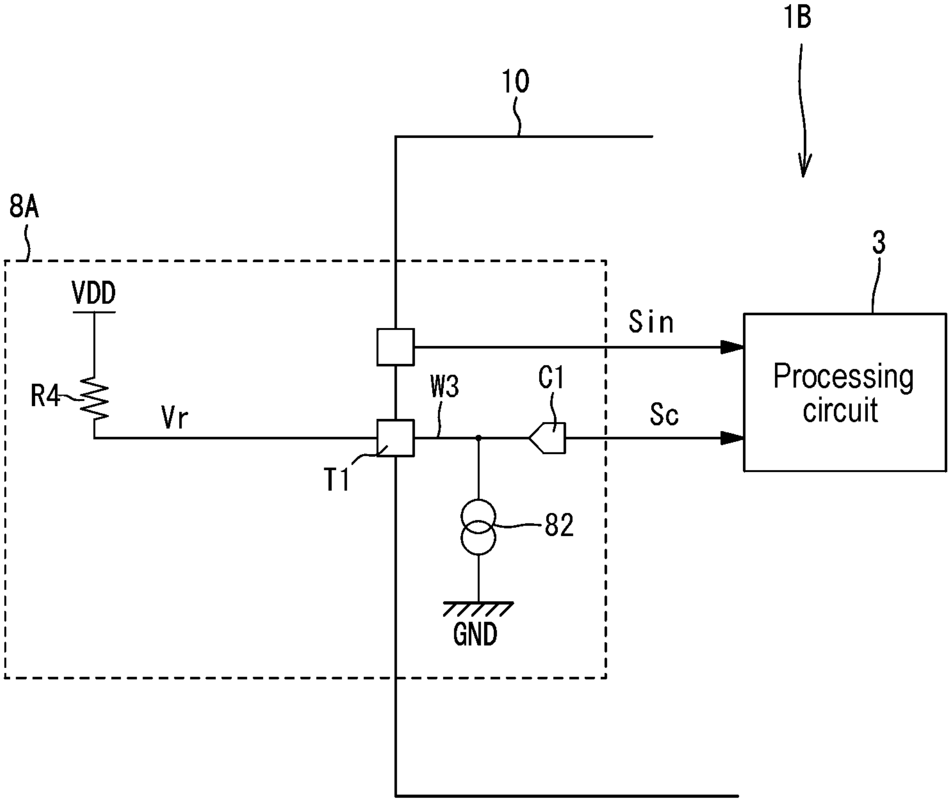
FIG. 10 is a schematic circuit diagram of an address signal output circuit of another example of the second modification.
FIG. 11 is a schematic diagram of an address table when the address signal output circuit shown in FIG. 10 is used.

FIG. 10 is a schematic circuit diagram of an address signal output circuit 8A of another example of the second modification. FIG. 11 is a schematic diagram of an address table Tb3 when the address signal output circuit 8A shown in FIG. 10 is used. As in the address signal output circuit 8A shown in FIG. 10, the power supply voltage VDD is connected to the AD converter C1 via a resistor R4. A constant current circuit 82 is connected to a wiring W3 connecting the resistor R4 and the AD converter C1. The constant current circuit 82 is connected to the ground GND. The constant current circuit 82 is configured so that a current is drawn from the wiring W3 to the ground GND. The constant current circuit 82 constitutes a pull-down circuit. In the semiconductor device 1B, the constant current circuit 82 may be incorporated into the functional IC 10.

As shown in FIG. 10, the current flowing through the wire W3 is drawn to the ground via the constant current circuit 82. Thus, when the current flowing through the wire W3 is a current I and a resistance value of the resistor R4 is a resistance value R, an address voltage Vr is a voltage drop, which is given by a product of the current I and the resistance value R, from the power supply voltage VDD. Therefore, the address voltage Vr can be adjusted by adjusting the resistance value R.

By using the address signal output circuit 8A shown in FIG. 10, the device address Ad can be determined by a value of a device address setting signal Sc obtained by digital conversion of the address voltage Vr.

For example, in the address table Tb3 shown in FIG. 11, when the device address setting signal Sc is equal to or greater than VDD-U1 and smaller than VDD-U2, the device address Ad is "0." Similarly, when the device address setting signal Sc is equal to or greater than VDD-U2 and smaller than VDD-U3, the device address Ad is "1." Further, when the device address setting signal Sc is equal to or greater than VDD-U3 and smaller than VDD-U4, the device address Ad is "2." When the device address setting signal Sc is equal to or greater than VDD-U4 and smaller than VDD-U5, the device address Ad is "3."

In addition, in the address signal output circuit 8A, due to abnormality in the wiring connected to the resistor R4, the connection of the address signal output circuit 8A to the resistor R4 may become insufficient, i.e., the address signal output circuit 8A may be open. In this case, the address voltage Vr becomes approximately zero. Further, the resistance value of the resistor R4 may become very small. In this case, the address voltage Vr becomes approximately equal to the power supply voltage VDD. Thus, when abnormality occurs in the address signal output circuit 8A, the address voltage Vr becomes approximately zero or approximately equal to the power supply voltage VDD.

In preparation for the occurrence of the abnormality described above, in the address table Tb3 shown in FIG. 11, an autonomous operation is associated with the device address setting signal Sc that is smaller than VDD-U1 or equal to or greater than VDD-U5.

By using the address signal output circuits 8 and 8A of the second modification, it is possible to simplify the circuit configuration.

<Application to DC/DC Converter>

Figure 12:
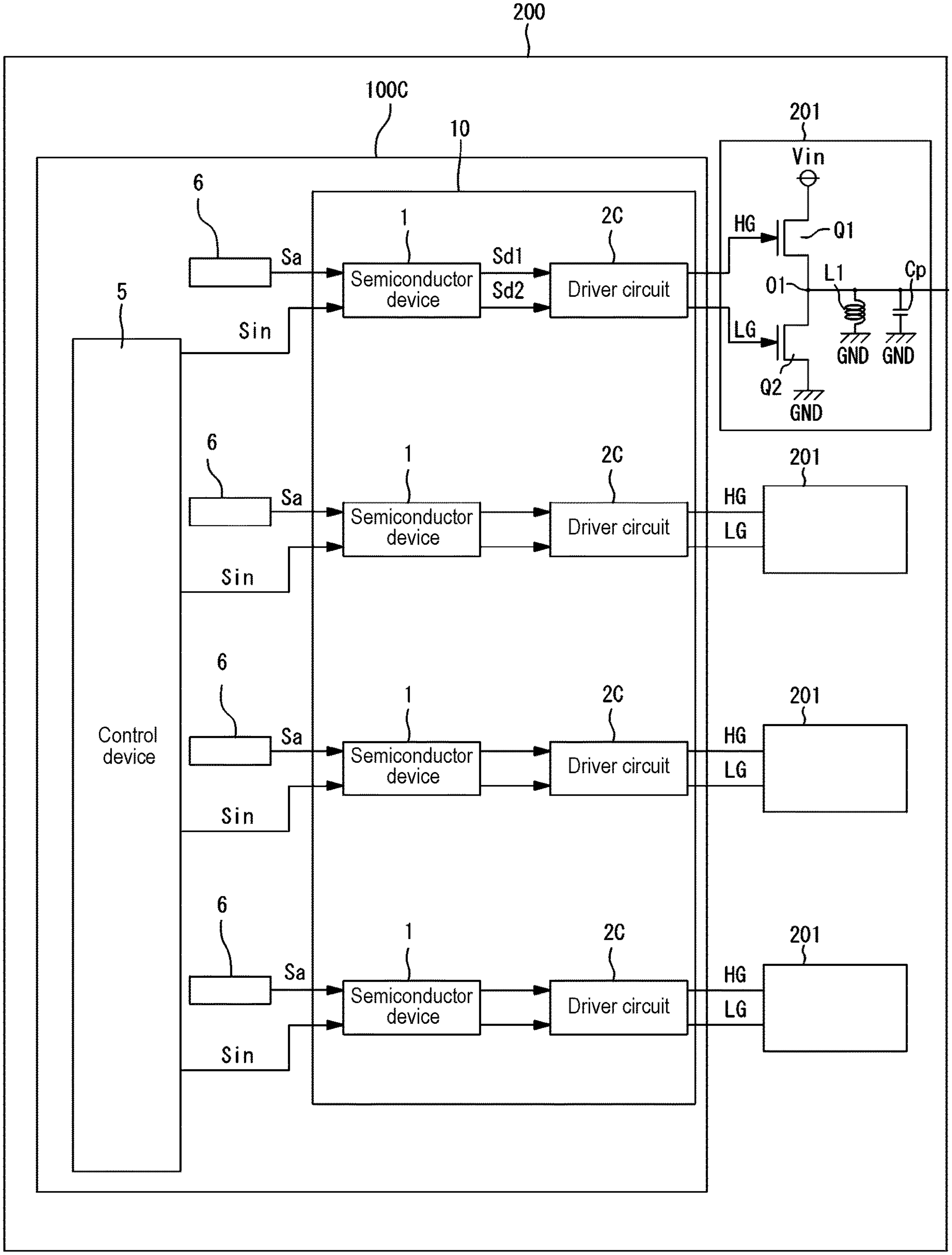
FIG. 12 is a schematic circuit diagram of a DC/DC converter.

FIG. 12 is a schematic circuit diagram of a DC/DC converter 200. A semiconductor module 100C shown in FIG. 12 has a driver circuit 2C different from the driver circuit 2. Further, the semiconductor module 100C is different from the semiconductor module 100 shown in FIG. 3 in that the driver circuit 2C drives output stages 201 of the DC/DC converter. The semiconductor module 100C is substantially the same as the semiconductor module 100 in other respects. The substantially same parts are designated by the same reference numerals and detailed descriptions of the same parts will be omitted. In addition, in the DC/DC converter 200 shown in FIG. 12, only one output stage 201 is shown in a schematic circuit diagram, and the remaining output stages 201 are shown in blocks.

The DC/DC converter 200 shown in FIG. 12 includes the semiconductor module 100C. The output stage 201 of the DC/DC converter 200 is connected to each driver circuit 2C of the semiconductor module 100C. The output stage 201 of the DC/DC converter 200 is a circuit constituting a part of a step-down type DC/DC converter that steps down and outputs an input voltage Vin. However, the present disclosure is not limited thereto. The output stage 201 of the DC/DC converter 200 may be a step-up type DC/DC converter that steps up and outputs the input voltage Vin. As shown in FIG. 12, the output stage 201 includes a high-side switching element Q1 and a low-side switching element Q2 which are connected in series.

The input voltage Vin is supplied to one end of the high-side switching element Q1. The high-side switching element Q1 and the low-side switching element are connected at a connection point O1, which is connected to a smoothing circuit constituted by an inductor L1 and a capacitor Cp. A switch voltage generated at the connection point O1 is rectified and smoothed by the smoothing circuit and is output as an output voltage. The low-side switching element Q2 is connected to the ground GND.

In the DC/DC converter 200, a high-side drive signal HG is supplied to the high-side switching element Q1, and a low-side drive signal LG is supplied to the low-side switching element Q2 by the driver circuit 2C. Thus, the high-side switching element Q1 and the low-side switching element Q2 are controlled to be turned on and turned off complementarily. In addition, the term "complementarily" refers to a state in which turning-on and turning-off of the high-side switching element Q1 and the low-side switching element Q2 are switched alternately. To explain further, the term not only includes a case in which the high-side switching element Q1 and the low-side switching element Q2 are completely switched, but also includes, for example, a dead time in which the high-side switching element Q1 and the low-side switching element Q2 are both turned off.

Each driver circuit 2C outputs the high-side drive signal HG and the low-side drive signal LG so as to obtain an output instructed by the drive information of the first drive signal Sd1 from the processing circuit 3. Thus, the switching voltage is adjusted. In addition, as described above, when the autonomous operation is started, each driver circuit 2C receives the second drive signal Sd2 from the autonomous processing circuit 4 and outputs the high-side drive signal HG and the low-side drive signal LG. Thus, an output voltage of a determined voltage value is output even when the voltage value cannot be specified by the control signal Sin. Although the DC/DC converter 200 is configured to use the semiconductor module 100C including the address signal output circuit 6, the present disclosure is not limited thereto. The DC/DC converter 200 may be configured to use a semiconductor module including any of the address signal output circuits 7, 7A, 8, and 8A.

<Application to Vehicle>

Figure 13:
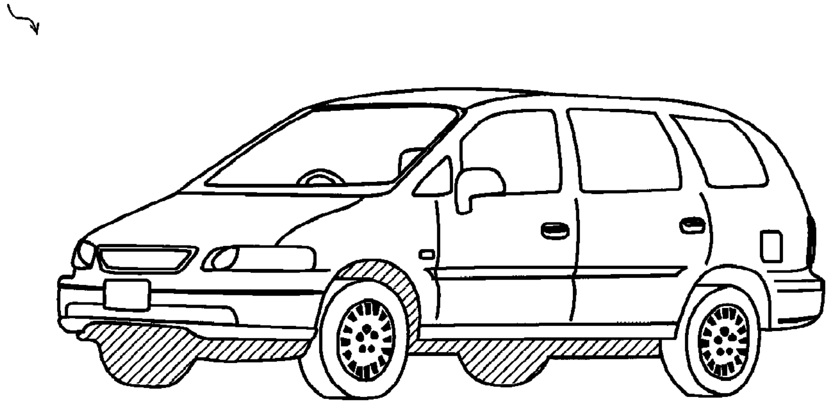
FIG. 13 is a diagram showing an external appearance of a vehicle.

FIG. 13 is a diagram showing an external appearance of a vehicle 300. The vehicle 300 of this configuration example is equipped with various electronic devices that operate with electric power supplied from a battery.

The vehicle 300 not only includes engine vehicles, but also includes electric vehicles (a BEV [battery electric vehicle], an HEV [hybrid electric vehicle], a PHEV/PHV (plug-in hybrid electric vehicle/plug-in hybrid vehicle), or an xEV such as FCEV/FCV (fuel cell electric vehicle/fuel cell vehicle)).

In addition, the semiconductor module 100 described above can be incorporated into a power supply device that supplies electric power to electronic devices mounted on the vehicle 300. The semiconductor module 100 can also be incorporated into the electronic devices themselves. By incorporating the semiconductor module 100 into the power supply device that supplies electric power to the electronic devices, since the driver circuit 2 is controlled by the second drive signal Sd2 from the autonomous processing circuit 4 even when the driver circuit 2 cannot be controlled by the control signal Sin, tail lamps of the vehicle 300, for example, can be kept turned on. Thus, it is possible to improve user convenience.

Others

The above-described embodiments should be considered to be exemplary in all respects and not limitative. The technical scope of the present disclosure is defined by the claims, not by the above description of the embodiments, and should be understood to include all modifications that are equivalent in meaning and scope to the claims.

Supplementary Notes

A semiconductor device (1, 1A, 1B) for controlling a driver circuit (2, 2C) configured to drive an electronic device, includes: a processing circuit (3) configured to control the driver circuit (2, 2C) according to a device address setting signal (Sa, Sb, Sc) from outside and a control signal (Sin) from outside; and an autonomous processing circuit (4) provided independently of the processing circuit (3) and configured to control the driver circuit (2, 2C) under a preset condition, wherein when the device address setting signal (Sa, Sb, Sc) falls within a predetermined condition, the processing circuit (3) is enabled and the autonomous processing circuit (4) is disabled, and when the device address setting signal (Sa, Sb, Sc) deviates from the predetermined condition, the autonomous processing circuit (4) is enabled and the processing circuit (2) is disabled (first configuration).

In the semiconductor device (1, 1A, 1B) of the first configuration, the processing circuit (2) may be configured to be enabled when the device address setting signal (Sa, Sb, Sc) is equal to or greater than a first threshold value (Th1) (second configuration).

In the semiconductor device (1, 1A, 1B) of the first or second configuration, the processing circuit (2) may be configured to be enabled when the device address setting signal (Sa, Sb, Sc) is smaller than a second threshold value (Th2) (third configuration).

In the semiconductor device (1, 1A, 1B) of any one of the first to third configurations, the autonomous processing circuit (4) may be configured to control the driver circuit (2, 2C) to drive the electronic device (201) with a predetermined setting (fourth configuration).

In the semiconductor device (1, 1A, 1B) of any one of the first to fourth configurations, the autonomous processing circuit (4) may be configured to be capable of connecting to a memory (41), and may be configured to control the driver circuit (2) under a setting condition set in the memory (41) (fifth configuration).

In the semiconductor device (1, 1A, 1B) of any one of the first to fifth configurations, the autonomous processing circuit (4) may be configured to control the driver circuit (2, 2C) to stop (sixth configuration).

The semiconductor device (1, 1A, 1B) of any one of the first to sixth configurations may further include a setting circuit including at least one of a resistor or a capacitor, and the autonomous processing circuit (4) may be configured to control the driver circuit (2, 2C) based on an input from the setting circuit (seventh configuration).

In the semiconductor device (1, 1A, 1B) of any one of the first to seventh configurations, the device address setting signal (Sa, Sb) may be a voltage signal obtained by dividing a reference voltage (VDD) by voltage-dividing resistors (R1, R2) (eighth configuration).

In the semiconductor device (1C) of any one of the first to seventh configurations, the device address setting signal (Sc) may be a voltage signal provided by a current flowing through a constant current circuit (81, 82) and a resistor (R3, R4) (ninth configuration).

A semiconductor module (100, 100*c*) includes: a plurality of the semiconductor devices (1, 1A, 1B) of any one of the first to ninth configurations; the driver circuit (2) of any one of the first to ninth configurations; and a control device (5) configured to transmit the control signal (Sin) to each of the semiconductor devices (1, 1A, 1B) (tenth configuration).

The semiconductor module (100, 100*c*) of the tenth configuration may be formed in one package (eleventh configuration).

An LED drive device includes: the semiconductor module (100) of the tenth or eleventh configuration; and an LED (9) driven by the driver circuit (2) of the semiconductor module (100) (twelfth configuration).

A DC/DC converter (200) includes: the semiconductor module (100C) of the tenth or eleventh configuration; and switching elements (Q1, Q2) driven by the driver circuit (2C) of the semiconductor module (100C) (thirteenth configuration).

An electric vehicle (300) includes the semiconductor module (100) of the tenth or eleventh configuration (fourteenth configuration).

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A semiconductor device for controlling a driver circuit configured to drive an electronic device, comprising:

a first processing circuit configured to control the driver circuit according to a device address setting signal from outside and a control signal from outside; and a second processing circuit provided independently of the first processing circuit and configured to, based on a voltage of the device address setting signal deviating from a valid range for specifying a device address, control the driver circuit, wherein the driver circuit controlled by the first processing circuit is the same as the driver circuit controlled by the second processing circuit, and wherein based on the voltage of the device address setting signal falling within the valid range, the first processing circuit is configured to be enabled and the second processing circuit is configured to be disabled, and based on the voltage of the device address setting signal deviating from the valid range, the second processing circuit is configured to be enabled and the first processing circuit is configured to be disabled.

2. The semiconductor device of claim 1, wherein the first processing circuit is configured to be enabled when the voltage of the device address setting signal is equal to or greater than a first threshold value.

3. The semiconductor device of claim 1, wherein the first processing circuit is configured to be enabled when the voltage of the device address setting signal is smaller than a second threshold value.

4. The semiconductor device of claim 1, wherein the second processing circuit is configured to control the driver circuit to drive the electronic device with a predetermined setting.

5. The semiconductor device of claim 1, wherein the second processing circuit is configured to be capable of connecting to a memory, and is configured to control the driver circuit under a setting condition set in the memory.

6. The semiconductor device of claim 1, wherein the second processing circuit is configured to control the driver circuit to stop.

7. The semiconductor device of claim 1, further comprising a setting circuit including at least one of a resistor or a capacitor, wherein the second processing circuit is configured to control the driver circuit based on an input from the setting circuit.

8. The semiconductor device of claim 1, wherein the device address setting signal is a voltage signal obtained by dividing a reference voltage by voltage-dividing resistors.

9. The semiconductor device of claim 1, wherein the device address setting signal is a voltage signal provided by a current flowing through a constant current circuit and a resistor.

10. A semiconductor module, comprising:

a plurality of the semiconductor devices according to claim 1;

a plurality of driver circuits, which are controlled by the semiconductor devices, respectively; and a control device configured to transmit the control signal to each of the semiconductor devices.

11. The semiconductor module of claim 10, which is formed in one package.

12. A light emitting device (LED) drive device, comprising:

the semiconductor module of claim 10; and a plurality of LEDs driven by the driver circuits of the semiconductor module, respectively.

13. A DC/DC converter, comprising:

the semiconductor module of claim 10; and switching elements driven by the driver circuits of the semiconductor module, respectively.

14. A vehicle comprising:

a power supply device that supplies electric power to electronic devices mounted on the vehicle; and the semiconductor module of claim 10, which is incorporated into the power supply device.

15. A semiconductor device for controlling a driver circuit configured to drive an electronic device, comprising:

a first processing circuit configured to control the driver circuit according to a device address setting signal from outside and a control signal from outside; and a second processing circuit provided independently of the first processing circuit and configured to control the driver circuit under a preset condition, wherein, based on the device address setting signal falling within a predetermined condition, the first processing circuit is configured to be enabled and the second processing circuit is configured to be disabled, and based on the device address setting signal deviating from the predetermined condition, the second processing circuit is configured to be enabled and the first processing circuit is configured to be disabled, and wherein the first processing circuit is configured to be enabled based on the device address setting signal being equal to or greater than a threshold value.

16. A semiconductor device having a driver circuit configured to drive a connected load, comprising:

an external terminal configured to be connected to a resistor;

a first processing circuit configured to select a device operation based on information obtained according to a resistance value of the resistor; and a second processing circuit provided independently of the first processing circuit, wherein one of the first processing circuit and the second processing circuit is configured to control the driver circuit according to a control signal from outside, and the other of the first processing circuit and the second processing circuit is configured to control the driver circuit based on preset information independent of the control signal from outside, and wherein one of the first processing circuit and the second processing circuit is enabled according to whether the information obtained according to the resistance value is within a predetermined valid range, and only the enabled one of the first processing circuit and the second processing circuit controls the driver circuit.

17. The semiconductor device of claim 16, further comprising a memory configured to be capable of storing setting information.

18. The semiconductor device of claim 17, wherein the second processing circuit is configured to control the driver circuit based on the setting information stored in the memory when a value of the information for selecting the device operation deviates from the predetermined valid range.

19. The semiconductor device of claim 16, further comprising a conversion circuit configured to convert the resistance value of the resistor connected to the external terminal into a digital signal.

* * * * *